July 22, 1947.   T. E. GRAVES   2,424,393
PRESSURE COOKER AND CONTROL THEREFOR
Filed Aug. 14, 1945
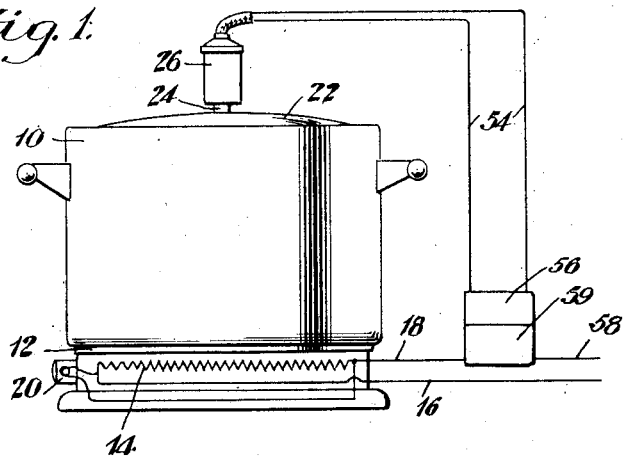
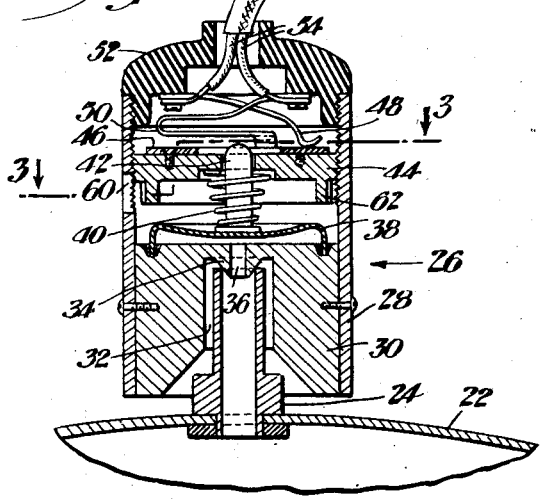
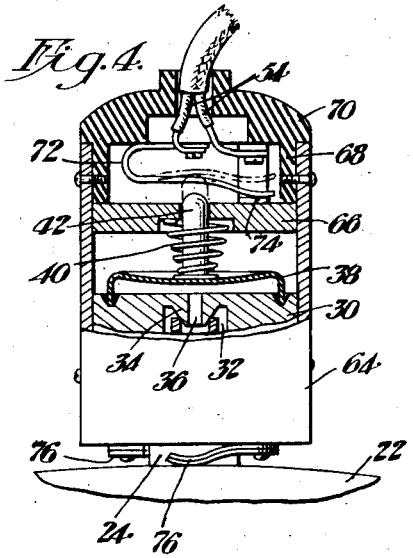
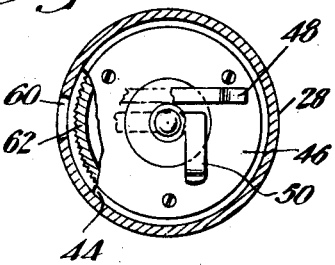
INVENTOR.
THEODORE E. GRAVES
BY
ATTORNEYS Patented July 22, 1947

2,424,393

UNITED STATES PATENT OFFICE 2,424,393

PRESSURE COOKER AND CONTROL THEREFOR

Theodore Eliot Graves, West Orange, N. J., assignor to The Wilcolator Company, Elizabeth, N. J., a corporation of Delaware Application August 14, 1945, Serial No. 610,853

14 Claims. (Cl. 219—43)

1

This invention relates to improvements in pressure cookers, and more particularly to electrically heated pressure cookers provided with means responsive to the pressure in the cooker for automatically controlling the heating of the pressure cooking vessel.

Pressure cookers are now widely used in various sizes for domestic purposes, and in spite of the desirability of having an automatic control, no automatic control system has been adopted as far as known. Electrically heated pressure cookers have been proposed in which the temperature of the heating unit is thermostatically controlled, but such controls have not been found entirely satisfactory because the temperature of the heating unit does not have a fixed relation to the pressure inside the cooking vessel due to the effect of cold food in contact with the vessel and the relatively short time necessary to complete the cooking operation. It has also been proposed to control an electric heater for a pressure cooker in response to steam pressure from inside the cooking vessel. However, in such systems as proposed, considerable auxiliary equipment and connections have been employed which have mitigated against the use of pressure cookers with these controls. In these proposed systems a pressure switch is either built into the body of the cooking vessel, or suitable tubular connections opening into the pressure vessel and leading to an outside pressure switch have been provided.

According to the present invention, the disadvantages of prior known constructions have been avoided by providing a pressure control which is not built into the pressure cooker, but which comprises a part of the standard weight that is dropped over the standard vent pipe in the cover of the cooker.

An important feature of the present invention is the provision of a combined control and weight adapted to apply the customary pressure to the vent pipe of a pressure cooker, the weight member comprising a means responsive to the pressure in the vent pipe and arranged to operate an electric switch having terminals and lead lines which connect into the heating circuit for the pressure cooking vessel. The unitary weight control also preferably includes a thermo-responsive means for holding the weight plug off its seat until the initially trapped air has been driven from the cooker. This means may be provided on a standard weight. A weight including these elements may be dropped over the cooker vent pipe without waiting for the air to vent. When steam heats the thermo-means, the weight seals

2 the vent, and when the pressure in the cooker approaches that for which the weight is made, the pressure responsive means opens the switch and cuts off the electric current to the heater.

The improved apparatus includes the same safety weight feature as now commonly used, the new weight, however, being fitted with a short electric cord which may be connected into the back of the stove or plugged into a receptacle at the back of the stove and from there connected into one of the top heating elements of the stove. The improved weight and connecting electric cord may comprise a part of an individual electric heater, or the cord may be provided with a plug which may be connected into the circuit used to control any heater.

According to a preferred form of the invention, the improved safety weight member includes a snap acting diaphragm which is set to snap at the desired pressure, as for example 15 lbs. per square inch, the pressure commonly used in pressure cookers. The snap acting diaphragm is mounted above the usual plug which rests in the vent pipe of the cooker and within a unitary structure which includes the plug, the plug having an axial bore to admit steam from the cooking vessel to the under side of the diaphragm which operates a pin to open a switch mounted in the upper part of the weight member. A feature of the weight member is the inclusion of a spring loaded diaphragm, including means for varying the spring load so that the diaphragm is snapped and opens the switch at any desired pressure.

The improved pressure cooker and control therefor includes other features, objects and advantages which will be understood by those skilled in the art from the following description taken in connection with the accompanying drawings forming a part of this application.

In the drawings:

Fig. 1 is a diagrammatic elevational view showing a pressure cooker combined with an electrical heating unit, arranged in accordance with the present invention.

Fig. 2 is a broken vertical sectional view showing the details of construction of one form of weight control member.

Fig. 3 is a sectional view taken on the broken line 3—3 of Fig. 2.

Fig. 4 is a broken vertical sectional view similar to that of Fig. 2, showing a modified construction for the weight control member.

In the diagrammatic showing of Fig. 1 of the drawings, the apparatus includes a pressure cooking pot 10 seated on an electrical heating plate 12 provided with a heating element 14 supplied with current through leads 16 and 18. The heating element 14 is bridged by a pilot light 20.

The pressure cooking pot 10 is provided with a cover 22 which is sealed with respect to the pot by any conventional means, not shown. The cover has an upwardly projecting safety vent pipe 24 which communicates with the inside of the pot. According to the present invention, the usual safety weight for the vent pipe is replaced by a weighted control member 26 which is adapted to provide the standard pressure in the pressure cooking pot and to control the heating of the pot.

The weighted control member 26, as shown in Fig. 2, comprises a cylindrical casing 28 threaded internally at the top, a metal weight 30 secured in the lower portion of the casing 28 by screws, as shown, or by other means if desired. The weight 30 is provided with a cylindrical bore 32 which fits over the vent tube with sufficient clearance for the escape of steam in the usual manner, the upper part of which includes a tapered plug 34 to provide a tight joint with the top of the vent pipe 24. The plug 34 has a central bore 36 which extends through the weight 30, and through which steam reaches the under side of a snap diaphragm 38 having a downwardly projecting cylindrical rim soldered in a groove in the upper portion of the weight 30. Steam from the pot 10 may pass through the vent pipe 24 and the bore 36 to the diaphragm 38 but is prevented from escaping except around the plug because of the rim of the diaphragm which is sealed to the top of the weight 30.

The diaphragm 38 is loaded by a spring 40 mounted between a collar on a plunger or pin 42 which rests on the diaphragm and an under surface of a disk 44 threaded to engage the casing 28. The spring 40 is engaged in a recess in the lower portion of the disk 44, and the plunger 42 projects through a central bore in the disk 44. The spring is loaded to snap up when a predetermined pressure, of, for example, 15 lbs. per square inch, is reached in the pot 10. When the diaphragm snaps up, it opens the electrical circuit to the heater 14, and thereby prevents further increase in the pressure in the pot.

The switch operated by the diaphragm 38 and plunger 42 comprises a contact plate 46 which is attached to the disk 44 with counter-sunk screws, as indicated, a contact spring 48, and a movable spring contact 50, the latter of which extends directly over the push rod or plunger 42. The upper portion of the casing 28 is closed by means of a cover 52 of insulating material having a threaded extension which engages the internal thread of the casing 28. The contact members 48 and 50 are mounted on the under side of the cover 52 and connected to lead wires 54 which terminate in a plug 56. The plug 56 connects into the lead wire 18 and a current supply wire 58 in a control or receptacle 59. The heater 14 is operated by the passage of current through the wires 16 and 58, the current flowing through the wires 54, the spring contact members 48 and 50, and the wire 18.

The load applied by the spring 40 may be varied or adjusted by rotating the disk 44 in its threaded connection with the casing. This is accomplished by inserting a pointed tool such as an ice pick through an opening 60 in the casing 28 and engaging vertical ridges on a cylindrical projection 62, to effect rotation of the disk 44 in the desired direction. Normally the diaphragm 38 will be set by adjusting the disk 44 so as to snap at approximately 15 lbs. per square inch. As the diaphragm 38 snaps up, the plunger disengages the spring contact 50 from the contact ring 46, to break the circuit to the heater 14. When the pressure in the cooking pot 10 goes slightly below that for which the diaphragm is set, the diaphragm snaps back and closes the switch to supply current to the heater 14.

For certain types of electrical heaters, such as those used in some electric ranges, enough heat is retained in the heating plate for the usual cooking period of from three to five minutes, when the circuit is once broken by the pressure-operated diaphragm. However, for canning purposes where a longer period is required, the control will recycle when the pressure drops from one to three pounds, and will continue on and off indefinitely. The weighted control member of the present invention may be used with the standard safety vent pipe. Furthermore, the heater element or stove into which the weighted control member of the present invention is plugged, is not limited in its use to pressure cooking only, because the circuit through the weighted control member is normally closed so that the heater 12 may be used for frying or other purposes as long as the pressure cooker control member is plugged in.

A slightly modified and in some respects more simple weighted pressure-operated control member is illustrated in Fig. 4 of the drawings, in which many of the parts are the same as in the member 26 shown in Fig. 2. In this construction, the pressure-operated mechanism and weight are mounted in a cylindrical casing 64 having a smooth inside wall throughout. The upper portion of the spring 40 is seated in a recess in the under side of a disk 66 of insulating material which slides freely in the casing 64. This disk bears against the under side of a cylindrical flange 68 integral with a cover 70 of insulating material which is held to the casing 64 by means of screws as shown.

The chamber formed between the disk 66 and the cover 70 houses a switch operated by the pin 42, comprising a spring contact member 72 attached to one of the lead wires 54, and a contact 74 electrically connected to the other lead wire 54. When the diaphragm 38 snaps up, the plunger pushes the spring member 72 to the dotted line position and breaks the circuit to the heating element. The pressure-operated control weight shown in Fig. 4 may be constructed with a spring 40 of predetermined loading characteristics and a flange 68 of the correct width so that the diaphragm 38 will snap up at a predetermined pressure, such as 15 pounds per square inch, which is the pressure commonly used in domestic pressure cookers.

The weight member shown in Fig. 4 includes two or more bimetal legs 76 attached peripherally on the under side of the weight member by screws or other suitable means. These legs 76 are so bent that at normal room temperatures the weight is held up slightly when it is initially set over the vent tube 24 so that the tapered plug 34 does not seat snugly on the upper end of the vent tube of the pressure cooker. The bimetal members 76 have a substantially flat section bearing against the under side of the weight member and a bent-down portion including a flat section which engages the cover 22 of the cooker. When the cooker is initially set on the heater and the weight dropped over the vent tube the bimetal members 76 are relatively cool and hold the plug from seating thereby permitting the trapped air to escape until sufficient steam is generated to heat up the cover and the bimetal members 76 enough so that these members flex and permit the plug 34 to seat in the top of the vent tube 24. From this point on, the operation of the control is the same as that described above in connection with Figures 1, 2 and 3 of the drawings. The bimetal legs 76, or equivalent thermo-responsive means for initially permitting the escape of air normally trapped in the cooker may be provided on the weight of Fig. 2 or on a standard safety weight. The thermo-responsive means for initially preventing the weight from sealing may take other forms than that of the legs 76 and may be located on other parts of the weight so long as it is operable by heat from the steam generated in the cooker. The pressure cooker combination of the present invention includes a very simple and effective arrangement whereby a weighted safety member is combined with a pressure-operated control for automatically stopping and starting the heating of the pressure cooker. When the heating element is shut off by the diaphragm 38, the pressure within the vessel will begin to decrease as heat is lost therefrom, and when the pressure in the vessel falls below a preselected limit, the diaphragm 38 will snap back to close the switch and permit current to flow to the heating element 14. When the cooking operation in the pot 10 has been completed, the current to the heating element 14 is turned off at the usual switch, and the cooking pot then allowed to cool until the pressure is down to normal, when the safety weight control member 26 may be removed. If desired the pot 10 may be removed from the heater 12 to facilitate the cooling operation, the lines 54 being included in a cord which is sufficiently long to permit the shifting of the pot.

It is to be understood that the weighted control member, according to the present invention, may be used to control either a part or all of a heating element, such as the element 14, or to operate a heat regulator for a gas burner.

The pressure cooker combination of the present invention not only includes the usual safety vent pipe and weight, but also includes additional safety features provided by the positive control of the heating unit in response to the pressure generated in the cooker. In practice, the entire weight of the member 26 is preferably correlated with the setting of the spring 40 and diaphragm 38, so that the electric heating circuit will be opened at a slightly lower pressure than that which would cause any appreciable release of steam from the vent tube 24 through the bore 32. Such an arrangement provides a very quietly-operating cooker which is entirely safe to operate and which obviously involves less care and watching than other known types of pressure cookers. Furthermore, neither the control mechanism nor the air release means interfere with the sanitary conditions of, or the washing of the pot or cover. The weight may be cleaned but that is usually not necessary since it normally only contacts steam.

Having described the invention in its preferred form, what is claimed as new is:

1. The combination with a pressure cooker having a cooking vessel, a cover therefor, an open-ended safety vent pipe mounted on the cover and opening therethrough into the vessel and an electrical means for heating the vessel, of a weighted control member fitting over the vent pipe and adapted to close in the pipe to create a back pressure in the cooking vessel, an electrical switch within the weighted control member, electrical conductors connecting the terminals of the switch to the heating means and a source of power respectively, and means in said weighted member responsive to the pressure generated within the vessel for actuating the switch.

2. The combination with a pressure cooker having a cooking vessel, a cover therefor, an open-ended safety vent pipe mounted on the cover and opening therethrough into the vessel, means for heating the vessel, and a control for the heating means, of a weighted member fitting over the vent pipe and adapted to close in the pipe to create a back pressure in the cooking vessel, an electrical switch carried by the weighted member, electrical conductors connecting the terminals of the switch to the control for the heating means, and means in said weighted member responsive to the pressure generated within the receptacle for actuating the switch to interrupt the heating of the cooking vessel in response to a predetermined pressure built up in the cooking vessel.

3. The combination with a pressure cooker having a cooking vessel, a cover therefor, an open-ended safety vent pipe mounted on the cover and opening therethrough into the vessel, means for heating the vessel, and a control for the heating means, of a weighted control member fitting over the vent pipe and adapted to close in the tube to create a predetermined back pressure in the cooking vessel, a snap-acting diaphragm in the weighted control member responsive to the pressure in said pipe, an electrical switch carried by the weighted control member, electrical conductors connecting the terminals of the switch to the control for the heating means, said diaphragm being arranged to actuate said switch, and means for regulating the snapping pressure of the diaphragm.

4. In a portable pressure cooker including a cooking vessel for the food to be cooked, a fluid and pressure-tight cover secured thereto, a heating element for heating the vessel, an open-ended safety vent pipe projecting from the top of the cover and opening into the vessel the open end of which is closed by a removable weight member adapted to create a predetermined back pressure in the cooking vessel, said weight member including a tapered plug fitting the upper end of the vent pipe, a vertical bore in said plug opening into said pipe, a snap-acting diaphragm above said bore and sealed with respect to the remainder of the weight, the under side of said diaphragm being subjected to the pressure generated inside the vessel, an electrical switch in said weight member, means for opening said switch when said diaphragm is snapped up, means for connecting the terminals of said switch to the heating element and to a source of power respectively, whereby the power to said heating element is interrupted when said diaphragm is snapped up in response to a predetermined pressure generated in said cooking vessel.

5. In a portable pressure cooker including a cooking vessel for the food to be cooked, a fluid and pressure-tight cover secured thereto, a heating means for heating the cooking vessel and an open-ended safety vent pipe projecting from the top of the cover and opening into the vessel, the combination therewith of an improved removable weight member adapted to fit over said pipe and to create a predetermined back pressure in the cooking vessel, said weight member including a tapered plug fitting the upper end of the vent pipe, a snap-acting diaphragm sealing off a part of the interior of the weight member, a passageway through said plug having an opening into said pipe and an opening into said sealed-off part to subject the diaphragm to the pressure generated inside the vessel, an electrical switch in said weight member, means for opening said switch when said diaphragm is snapped in response to a predetermined pressure in said vessel, and means responsive to the opening of said switch for interrupting the heating means when said diaphragm is snapped in response to said pressure generated in said cooking vessel.

6. In a portable pressure cooker including a cooking vessel for the food to be cooked, a fluid and pressure-tight cover secured thereto, a heating means for heating the vessel, a control for the heating means, an open-ended safety vent pipe projecting from the top of the cover and opening into the vessel, the open end of which is closed by a removable weight member adapted to create a predetermined back pressure in the cooking vessel, said weight member including a cylindrical casing having a metal weight in its lower portion, said weight including a tapered plug fitting the upper end of the vent pipe, a snap-acting diaphragm having its rim sealed with respect to the top of the weight, a passageway through said plug extending to the under side of said diaphragm, a disk threaded to the casing above the diaphragm, a spring between the disk and diaphragm, an electrical switch in said weight member above said disk, means for opening said switch when said diaphragm is snapped up, means for connecting the terminals of said switch to the control for the heating means, and means for turning said disk to adjust the compression of said spring.

7. A removable weight adapted to be dropped over the open ended safety vent pipe of a pressure cooker, comprising a weight member having a vertical bore adapted to fit loosely over the standard vent pipe of a pressure cooker, a tapered plug in the upper portion of said bore fitting the upper end of said pipe, a snap-acting diaphragm mounted in said weight member above said plug and having a sealed rim, a passageway through said plug to the under side of said diaphragm, an electrical switch in said weight member, means for opening said switch when said diaphragm is snapped up, and lead wires attached to the terminals of said switch, the other ends of said wires being attached to the terminals in an electrical plug.

8. A removable weight adapted to be dropped over the open ended safety vent pipe of a pressure cooker, comprising a weight member having a vertical bore adapted to fit loosely over the standard vent pipe of a pressure cooker, a tapered plug in the upper portion of said bore fitting the upper end of said pipe, a pressure responsive means mounted in said weight member above said plug, a passageway through said plug to the pressure responsive means, and an electrical switch in said weight member operable by said pressure responsive means.

9. A removable weight adapted to be dropped over the open ended safety vent pipe of a pressure cooker, comprising a weight member having a vertical bore adapted to fit loosely over the standard vent pipe of a pressure cooker, a tapered plug in the upper portion of said bore fitting the upper end of said pipe, a pressure responsive means mounted in said weight member, a passage through said plug to said pressure responsive means, an electrical switch in said weight member responsive to the action of said means, and means for adjusting said pressure responsive means to act on said switch at a predetermined pressure generated in the pressure cooker.

10. A removable weight adapted to be dropped over the open ended safety vent pipe of a pressure cooker, comprising a weight member having means for preventing the weight from sealing the vent pipe until steam is generated in the cooker and has replaced the air therein, said weight member having a vertical bore adapted to fit loosely over the standard vent pipe of a pressure cooker, a tapered plug in the upper portion of said bore fitting the upper end of said pipe, a pressure responsive means mounted in said weight member above said plug, a passageway through said plug to the pressure responsive means, and an electrical switch in said weight member operated by said pressure responsive means.

11. A removable weight adapted to be dropped over the open ended vent tube of a pressure cooker for normally sealing the vent tube and creating a back pressure in the cooker, the weight including a thermostatic means adapted to support the weight in unsealed position on the vent tube when unheated by steam, said thermostatic means being mounted so that it is responsive to the temperature developed by steam at the vent tube to release the weight into sealing position on the vent tube.

12. A removable weight adapted to be dropped over the open ended vent tube of a pressure cooker, comprising a weight member having bimetallic legs adapted to engage the cover of the cooker, said legs being shaped so that at temperatures below about 212° F. said weight is prevented from sealing said vent tube whereby trapped air in the pressure cooker is replaced by steam generated therein, and said legs being adapted to assume a position at temperatures approximating 212° F. which permits the sealing of said tube by said weight.

13. A removable weight adapted to be dropped over the open ended safety vent pipe of a pressure cooker for sealing the vent pipe, comprising a weight member having a bore adapted to fit a pressure cooker vent pipe loosely, a pressure responsive means mounted in the weight member beyond said bore, a passageway in the weight member from the pressure responsive means to said bore arranged to communicate with the open upper end of the vent pipe of a pressure cooker, and an electrical switch in said weight member operable by said pressure responsive means.

14. A removable weight adapted to be dropped over the open upper end of a vent tube of a pressure cooker for normally sealing the vent tube and creating a back pressure in the cooker, comprising a weight member having a bore adapted to loosely fit the vent pipe of a pressure cooker, a pressure responsive means mounted in the weight member beyond said bore, a passageway in the weight member from the pressure responsive means to said bore arranged to communicate with the open upper end of the vent pipe of a pressure cooker, an electrical switch in said weight member operable by said pressure responsive means, and a thermostatic means carried by said weight member adapted to support the weight member in unsealed position on the vent tube when unheated to a temperature approaching steam temperature, said thermostatic means being mounted so that it is responsive to the temperature developed by steam at the vent tube so that the weight member is released to sealing position on the vent tube.

THEODORE ELIOT GRAVES.

REFERENCES CITED

The following references are of record in the file of this patent:

UNITED STATES PATENTS

| Number | Name | Date |
| --- | --- | --- |
| 2,333,993 | Frailing | Nov. 9, 1943 |
| 2,359,962 | Barnes | Oct. 10, 1944 |
| 2,308,603 | Graham | Jan. 19, 1943 |
| 1,931,190 | Goughnour | Oct. 17, 1933 |
| 1,047,418 | Kercher | Dec. 17, 1912 |
| 1,728,309 | Shreeve et al. | Sept. 17, 1929 |